United States Patent
Hinrichs

(10) Patent No.: US 9,356,509 B2
(45) Date of Patent: May 31, 2016

(54) REFERENCE CURRENT GENERATOR WITH SWITCH CAPACITOR

(71) Applicant: QUALCOMM Incorporated, San Diego, CA (US)

(72) Inventor: Jeffrey Mark Hinrichs, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 126 days.

(21) Appl. No.: 13/954,746

(22) Filed: Jul. 30, 2013

(65) Prior Publication Data

US 2015/0035513 A1    Feb. 5, 2015

(51) Int. Cl.
*G05F 1/575* (2006.01)
*H02M 3/156* (2006.01)
*G05F 1/56* (2006.01)

(52) U.S. Cl.
CPC .............. *H02M 3/156* (2013.01); *G05F 1/561* (2013.01); *G05F 1/575* (2013.01)

(58) Field of Classification Search
CPC .... G05F 1/575; H03G 1/0094; H03G 3/3031; H03F 3/005
USPC ............... 323/313–316, 288; 363/59–60; 320/119–120; 327/537
See application file for complete search history.

(56) References Cited

U.S. PATENT DOCUMENTS

| | | | | |
|---|---|---|---|---|
| 3,651,280 A | * | 3/1972 | Streckmann | 360/32 |
| 4,054,936 A | * | 10/1977 | Ansai et al. | 361/257 |
| 5,341,050 A | * | 8/1994 | Mellissinos | G06G 7/1865 327/355 |
| 5,394,732 A | * | 3/1995 | Johnson et al. | 73/19.1 |
| 5,512,814 A | * | 4/1996 | Allman | 323/267 |
| 5,677,645 A | * | 10/1997 | Merritt | H02M 3/073 327/536 |
| 6,191,637 B1 | | 2/2001 | Lewicki et al. | |
| 6,552,612 B1 | * | 4/2003 | Wilson | 330/254 |
| 7,786,801 B2 | | 8/2010 | Kim | |
| 7,944,194 B2 | | 5/2011 | Huang et al. | |
| 7,982,448 B1 | | 7/2011 | Prasad et al. | |
| 2003/0038669 A1 | | 2/2003 | Zhang | |
| 2011/0234290 A1 | * | 9/2011 | Ramamurthy | 327/332 |
| 2013/0043848 A1 | | 2/2013 | Lin | |

OTHER PUBLICATIONS

Abbasalizadeh H., "CMRR in Current Mirror Load Diff-Amp," Spring 2006, Mini Project for Analog IC Design, 27 Pages.
Huang M-H., et al., "Low-Ripple and Dual-Phase Charge Pump Circuit Regulated by Switched-Capacitor-Based Bandgap Reference", IEEE Transactions on Power Electronics, Institute of Electrical and Electronics Engineers, USA, vol. 24, No. 5, May 1, 2009, pp. 1161-1172, XP011255809, ISSN: 0885-8993.
International Search Report and Written Opinion—PCT/US2014/047956—ISA/EPO—Nov. 4, 2014.

* cited by examiner

*Primary Examiner* — Harry Behm
*Assistant Examiner* — Peter Novak
(74) *Attorney, Agent, or Firm* — Arent Fox LLP

(57) ABSTRACT

Exemplary embodiments are related to current generators. A device may include a first integration path for charging a first integration capacitor during a first phase and a second integration path for charging a second integration capacitor during a second phase. The first integration capacitor may be configured for charging a capacitor coupled to an amplifier during the second phase and the second integration capacitor may be configured for charging the capacitor during the first phase.

17 Claims, 5 Drawing Sheets

REFERENCE CURRENT GENERATOR WITH SWITCH CAPACITOR

BACKGROUND

1. Field

The present invention relates generally to reference current generation. More specifically, the present invention relates to embodiments for a reference current generator including enhanced stability.

2. Background

Various electrical applications, such as frequency-to-digital converters (FDC) or charge pump based clock multipliers, may require a reference current, which when integrated onto a capacitor over a reference time interval produces a voltage that may match a reference voltage. The generated voltage is often some fraction of a supply voltage VDD. Current prior-art implementations may require a very large compensation capacitor, which is undesirable.

A need exists for an enhanced reference current generator. More specifically, a need exists for embodiments related to a reference current generator having enhanced stability and a reduced sized compensation capacitor.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As noted above, in some applications, such as in frequency to digital converters (FDC) or charge pump based clock multipliers, there may be a need to generate a reference current that, when integrated onto a capacitor over a reference time interval (e.g., a multiple of a clock period), produces a voltage matching a reference voltage. The generated reference voltage is often some fraction of VDD or an inverter threshold.

Figure 1:
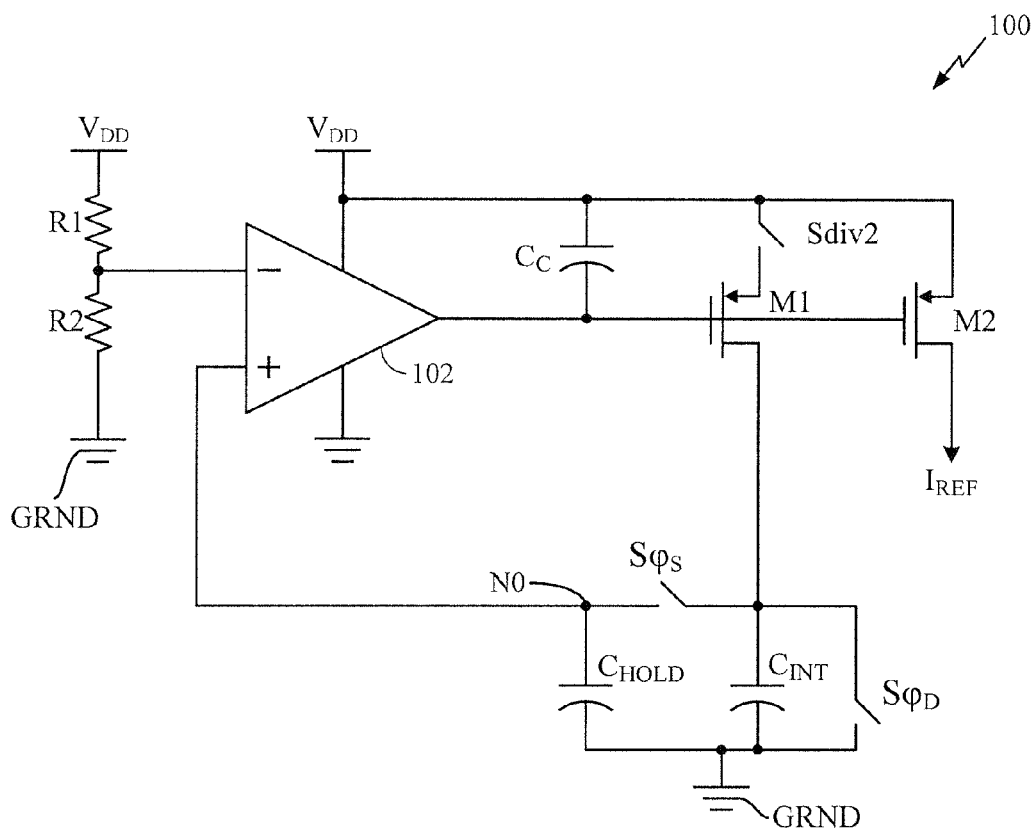
FIG. 1 depicts a circuit for generating a reference current.

FIG. 1 is a circuit diagram of a reference current generator 100. Reference current generator 100 includes an amplifier 102, resistors R1 and R2, capacitors $C_C$, $C_{HOLD}$, and $C_{INT}$, transistors M1 and M2, and switches $S\phi_D$, $S\phi_S$, and Sdiv2. During an operation of reference current generator 100, switch Sdiv2 may be closed for a time period (e.g., having a duration of one clock cycle) and a current is conveyed to charge capacitor $C_{INT}$. After the time period, switch Sdiv2 may be opened for another time period (e.g., having a duration of one clock cycle). During the time period wherein switch Sdiv2 is opened, switch $S\phi_S$ may be closed for a relatively short time period (i.e., a duration sufficient to enable a voltage across capacitor $C_{HOLD}$ to stabilize) to charge capacitor $C_{HOLD}$. Further, after switch $S\phi_S$ is opened, switch $S\phi_D$ may be closed for a relatively short time period (i.e., a duration sufficient to enable capacitor $C_{INT}$ to be discharged). As will be appreciated by a person having ordinary skill in the art, a voltage at node N0 is used by amplifier 102 to adjust the amount of current conveyed to capacitor $C_{INT}$ until an adequate voltage at node N0 is obtained.

Figure 2:
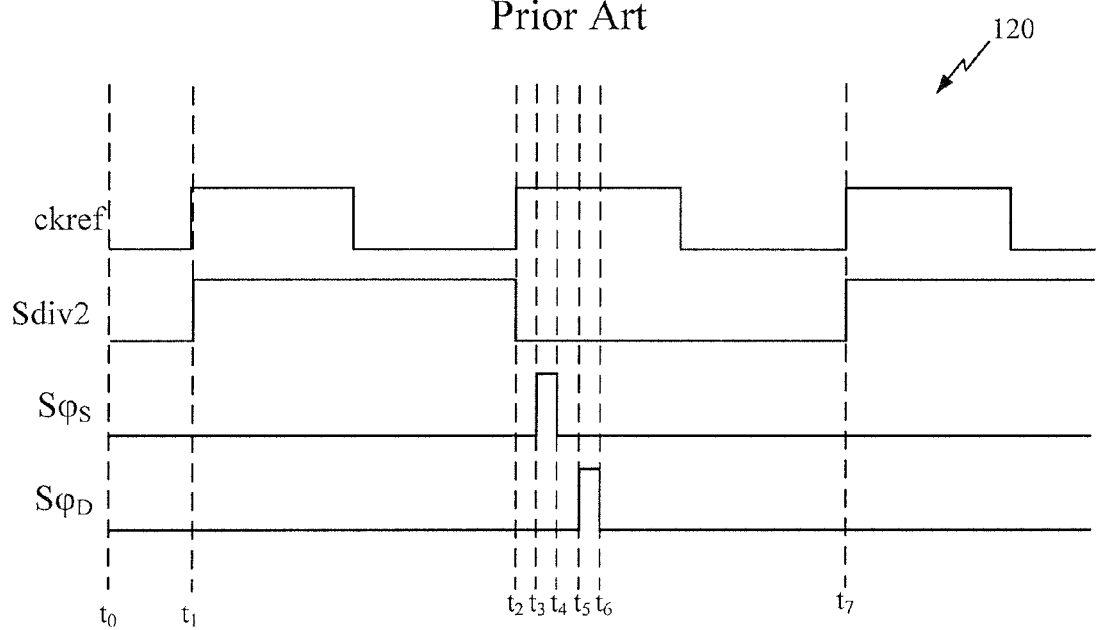
FIG. 2 is a timing diagram for the circuit illustrated in FIG. 1.

FIG. 2 is a timing diagram 120 for operating current generator 100. Timing diagram 120 includes timing signals for a clock reference ckref, switch Sdiv2, switch $S\phi_S$, and switch $S\phi_D$. As illustrated in timing diagram 120, switch Sdiv2 is closed (i.e., asserted to couple a source of transistor M1 to supply voltage $V_{DD}$) for a full clock cycle starting at time $t_1$ and ending and time $t_2$. Further, switch Sdiv2 is opened (i.e., negated to isolate the source of transistor M1 from supply voltage $V_{DD}$) for a full clock cycle starting at time $t_2$ and ending and time $t_7$. In addition, after switch Sdiv2 is closed at time t2, switch $S\phi_S$ is closed at time $t_3$ and opened at time $t_4$.

As noted above, switch $S\phi_S$ is closed for a time duration sufficient to enable a voltage across capacitor $C_{HOLD}$ (see FIG. 1) to stabilize. Moreover, after switch $S\phi_S$ is opened at time $t_4$, switch $S\phi_D$ is closed at time $t_5$ and opened at time $t_6$. As previously noted, switch $S\phi_D$ is closed for a time duration sufficient to enable capacitor $C_{INT}$ (see FIG. 1) to be discharged. This cycle may be repeated starting at time $t_7$. It is noted that each of switch $S\phi_S$, and switch $S\phi_D$ are closed (i.e., asserted) while switch Sdiv2 is negated.

As will be appreciated by a person having ordinary skill in the art, when settled, reference current generator 100 may generate a reference current $I_{REF}$ that when integrated over a clock period onto capacitor $C_{INT}$, generates a reference voltage, which may be a fraction of supply voltage VDD. For reference current generator 100 to be stable, a bandwidth of amplifier 102 must be substantially less than a frequency of a sampling clock. If the sampling clock is fairly low, for example 19.2 MHz, a very large compensation capacitor $C_C$ (e.g., between 10 and 100 picofarads (pF)) is required to stabilize a feedback loop.

It may appear that selecting a value of capacitor $C_{HOLD}$ that is much larger than a value of capacitor $C_{INT}$ may stabilize the feedback loop. However, if a large difference exists between a voltage on capacitor $C_{HOLD}$ and a voltage at the negative input terminal of amplifier 102 (e.g., when reference current generator 100 is first powered-up), an output of amplifier 102 may rail high or low. Therefore, changing the relative sizing of capacitor $C_{HOLD}$ and capacitor $C_{INT}$ may not be a viable option to stabilize current generator 100. One alternative is to brute-force compensate current generator 100 by using a very large compensation capacitor $C_C$, which is undesirable.

Exemplary embodiments, as described herein, are directed to a reference current generator. According to one exemplary embodiment, a device may include a hold capacitor coupled to an input of an amplifier. Further, the device may include a first integration capacitor configured for selectively charging the hold capacitor and a second integration capacitor configured for selectively charging the hold capacitor. According to another exemplary embodiment, a device may include a first integration path for charging a first integration capacitor during a first phase. The device may further include a second integration path for charging a second integration capacitor during a second phase. Moreover, the first integration capacitor may be configured for charging a capacitor coupled to an amplifier during the second phase and the second integration capacitor may be configured for charging the capacitor during the first phase.

According to another exemplary embodiment, the present invention includes methods for generating a reference current. Various embodiments of such a method may include generating a voltage at an input of an amplifier. The method may also include charging a hold capacitor coupled to the input of the amplifier via a first integration capacitor during a portion of a first phase and charging the hold capacitor via a second integration capacitor during a portion of a second, different phase. In accordance with another exemplary embodiment, a method may include coupling a first capacitor to a supply voltage during a phase and coupling a second capacitor to the supply voltage during another, different phase. The method may further include coupling the second capacitor to a hold capacitor during at least a portion of the phase and coupling the first capacitor to the hold capacitor during at least a portion of the another, different phase.

Other aspects, as well as features and advantages of various aspects, of the present invention will become apparent to those of skill in the art though consideration of the ensuing description, the accompanying drawings and the appended claims.

Figure 3:
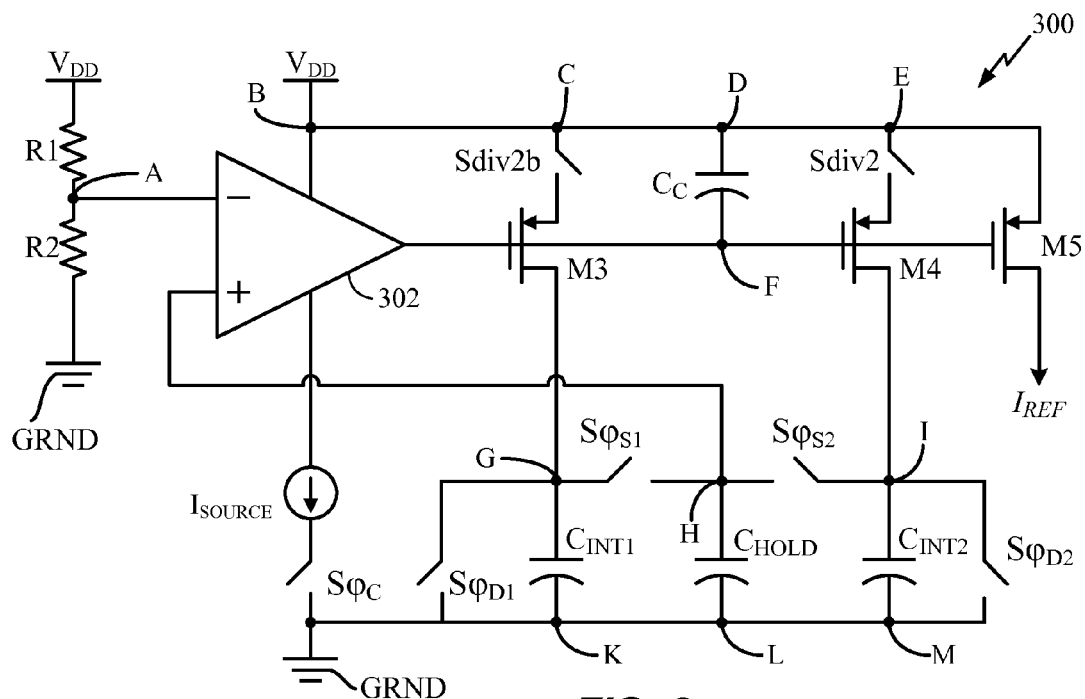
FIG. 3 is a circuit diagram of a current generator, according to an exemplary embodiment of the present invention.

FIG. 3 is a circuit representation of a current generator 300, according to an exemplary embodiment of the present invention. Current generator 300 is configured to generate a reference current $I_{REF}$. As depicted, current generator 300 includes amplifier 302, resistors R1 and R2, and capacitors $C_C$, $C_{INT1}$, $C_{HOLD}$, and $C_{INT2}$. Current generator 300 further includes transistors M3, M4, and M5, switches $S\phi_{D1}$, $S\phi_{D2}$, $S\phi_C$, $S\phi_{S1}$, $S\phi_{S2}$, Sdiv2, and Sdiv2b, and tail current source $I_{SOURCE}$. A first input (e.g., an inverting input) of amplifier 302 is coupled to a node A, which is positioned between resistors R1 and R2. Resistor R1 is further coupled to a supply voltage $V_{DD}$ and resistor R2 is further coupled to a ground voltage GRND. In addition, amplifier 302 is configured to receive supply voltage via a node B, which is further coupled to each of switch Sdiv2b, compensation capacitor $C_C$, switch Sdiv2, and a source of transistor M5.

An output of amplifier 302 is coupled to a gate of each of transistors M3, M4, and M5. A source of transistor M3 is coupled to a node C via switch Sdiv2b and a drain of transistor M3 is coupled to a node G. Moreover, a source of transistor M4 is coupled to a node E via switch Sdiv2 and a drain of transistor M4 is coupled to a node I. Compensation capacitor $C_C$ is coupled between nodes D and F. By way of example only, compensation capacitor $C_C$ may have a size of substantially 500 femtofarads (fF). A node H, which is switchably coupled to nodes G and I via respective switches $S\phi_{S1}$ and $S\phi_{S2}$, is further coupled to a second input (e.g., a non-inverting input) of amplifier 302 and capacitor $C_{HOLD}$. Capacitor $C_{INT1}$ is coupled between nodes G and K, capacitor $C_{HOLD}$ is coupled between nodes H and L, and capacitor $C_{INT2}$ is coupled between nodes I and M. Additionally, switch $S\phi_C$ is configured for coupling current source $I_{SOURCE}$ to ground voltage GRND, which is further coupled to nodes K, L, and M.

During an operation of reference current generator 300, switch Sdiv2 may be closed for a time period (e.g., having a duration of one clock cycle) and a current may be conveyed to charge capacitor $C_{INT2}$. Further, during another, different (i.e., a time period in which switch Sdiv2 is opened), switch Sdiv2b may be closed and a current may be conveyed to charge capacitor $C_{INT1}$. Moreover, during the time period in which switch Sdiv2 is closed and Sdiv2b is open, switch $S\phi_{S1}$ may be closed for a relatively short time period (i.e., a duration sufficient to enable a voltage across capacitor $C_{HOLD}$ to stabilize) to charge capacitor $C_{HOLD}$. Stated another way, switch $S\phi_{S1}$ may be closed for a duration sufficient to charge share between capacitor $C_{INT1}$ and capacitor $C_{HOLD}$. Further, after switch $S\phi_{S1}$ is opened, switch $S\phi_{D1}$ may be closed for a relatively short time period (i.e., a duration sufficient to enable capacitor $C_{INT1}$ to be discharged).

In addition, during the time period in which switch Sdiv2b is closed and Sdiv2 is open, switch $S\phi_{S2}$ may be closed for a relatively short time period (i.e., a duration sufficient to enable a voltage across capacitor $C_{HOLD}$ to stabilize) to charge capacitor $C_{HOLD}$. Stated another way, switch $S\phi_{S2}$ may be closed for a duration sufficient to charge share between capacitor $C_{INT2}$ and capacitor $C_{HOLD}$. Further, after switch $S\phi_{S2}$ is opened, switch $S\phi_{D2}$ may be closed for a relatively short time period (i.e., a duration sufficient to enable capacitor $C_{INT2}$ to be discharged). As will be appreciated by a person having ordinary skill in the art, a voltage at node G is used by amplifier 302 to adjust the amount of current conveyed to capacitors $C_{INT1}$ and $C_{INT2}$ until an adequate voltage at node H is obtained.

Figure 4:
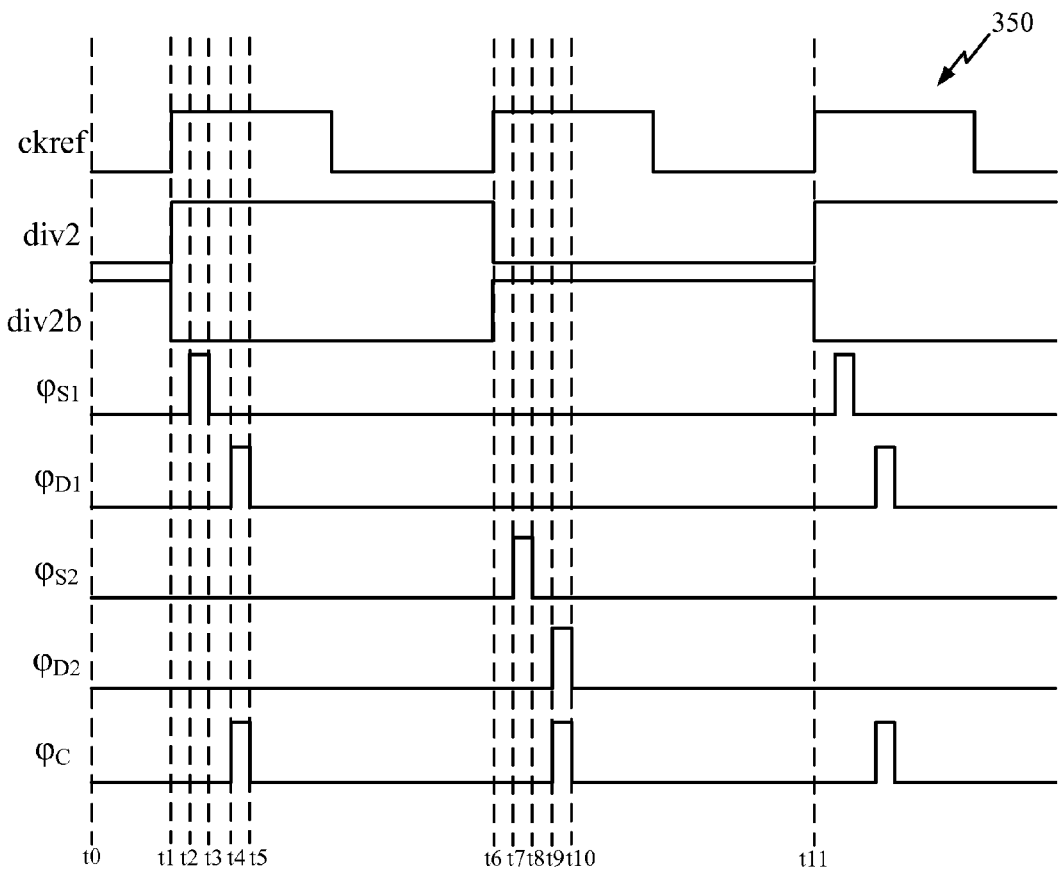
FIG. 4 is a timing diagram for the current generator of FIG. 3, in accordance with an exemplary embodiment of the present invention.

FIG. 4 is an example timing diagram 350 for operating current generator 300 of FIG. 3. Time diagram 350 includes timing signals for a clock reference ckref, switch Sdiv2, switch $S\phi_{S1}$, switch $S\phi_{D1}$, switch $S\phi_{S2}$, switch $S\phi_{D2}$, and switch $S\phi_C$. As illustrated in timing diagram 350, switch Sdiv2 is closed (i.e., asserted to couple a source of transistor M4 to supply voltage $V_{DD}$) and switch Sdiv2b is closed for a full clock cycle starting at time t1 and ending and time t6. Further, switch Sdiv2 is opened (i.e., negated to isolate the source of transistor M4 from supply voltage $V_{DD}$) and switch Sdiv2b is closed (i.e., asserted to couple a source of transistor M3 to supply voltage $V_{DD}$) for a full clock cycle starting at time t6 and ending and time t11. Additionally, after switch Sdiv2 is closed at time t1, switch $S\phi_{S1}$ is closed at time t2 and opened at time t3. Switch $S\phi_{S1}$ may be closed for a time duration sufficient to enable a voltage across capacitor $C_{HOLD}$ (see FIG. 3) to stabilize. Moreover, after switch $S\phi_{S1}$ is opened at time t3, switch $S\phi_{D1}$ is closed at time t4 and opened at time t5. Switch $S\phi_{S1}$ may be closed for a time duration sufficient to enable capacitor $C_{INT1}$ (see FIG. 3) to be discharged. Moreover, switch $S\phi_C$ is also closed at time t4 and opened at time t5.

After switch Sdiv2 is opened and switch Sdiv2b is closed at time t6, switch $S\phi_{S2}$ is closed at time t7 and opened at time t8. Switch $S\phi_{S2}$ may be closed for a time duration sufficient to enable a voltage across capacitor $C_{HOLD}$ (see FIG. 3) to stabilize. Moreover, after switch $S\phi_{S2}$ is opened at time t8, switch $S\phi_{D2}$ is closed at time t9 and opened at time t10. Switch $S\phi_{D2}$ may be closed for a time duration sufficient to enable capacitor $C_{INT2}$ (see FIG. 3) to be discharged. Moreover, switch $S\phi_C$ is also closed at time t9 and opened at time t10. As will be appreciated by a person having ordinary skill in the art, this cycle (i.e., the cycle from time t1 to time t10) may be repeated starting at time t11.

In comparison to prior art devices, reference current generator 300 may use a reduced-sized compensation capacitor by using a combination of amplifier bias current duty cycle throttling and double sampling. An update rate of the voltage on hold capacitor $C_{HOLD}$ is effectively doubled by adding a second integration capacitor $C_{INT2}$ and operating its integration, sampling, and discharge switches on the opposite phase of the div2 clock. As will be appreciated by a person having ordinary skill in the art, increasing the update rate of hold capacitor $C_{HOLD}$ allows the bandwidth of amplifier 302 to be correspondingly higher, requiring less compensation capacitance. To further reduce a bandwidth of amplifier 302, the tail current of amplifier 302 may be duty-cycle throttled using a very low duty cycle clock $\phi_C$.

It is noted that amplifier 302 may comprise a single-stage, five transistor design with an NMOS tail current source, NMOS differential pair, and PMOS current mirror load. Current source $I_{SOURCE}$ may comprise the NMOS tail current source. Shutting off the tail current (i.e., via current source $I_{SOURCE}$) to amplifier 302 freezes the voltage at its output until the next time the tail current is turned on. Since an output voltage of amplifier 302 can only change during a small period of time once per reference clock cycle, a bandwidth of amplifier 302 is greatly reduced, allowing a much smaller compensation capacitor $C_C$ to be used. Furthermore, the bandwidth reduction tracks the reference clock, maintaining good phase margin over a wide range of frequencies.

Figure 5:
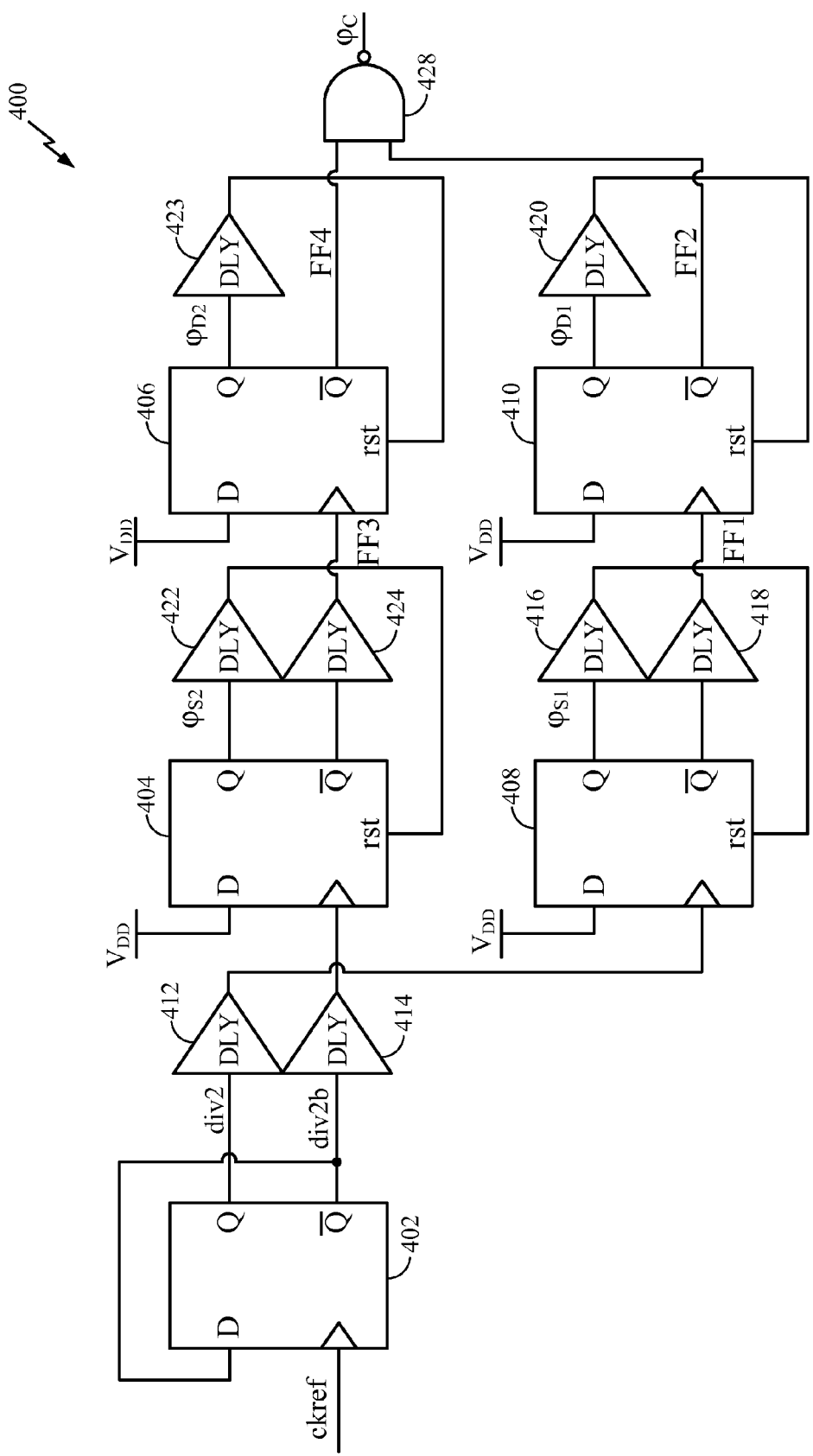
FIG. 5 is an example clock generator for generating the clocks illustrated in the timing diagram of FIG. 4.

FIG. 5 depicts a clock generator 400 for generating the clocks shown in timing diagram 350. It is noted that clock generator 400 is only an example of a clock generator that may be used for generating clocks signal and other suitable clock generators may be used for generating the clock signals. Clock generator 400 includes D-flip-flops 402, 404, 406, 408, and 410, buffers 412, 414, 416, 418, 420, 422, 424, and 426, and NAND gate 428. As will be appreciated by a person having ordinary skill in the art, D-flip-flop 402 may receive clock reference ckref and a feedback signal (e.g., signal div2b) and convey signals div2 and div2b. Further, signal div2 may be conveyed via buffer 412 to D-flip-flop 408, which also receives supply voltage $V_{DD}$. In response to receipt of signal div2 and supply voltage $V_{DD}$, D-flip-flop 408 may generate switch signal $\phi_{S1}$, which may be used for controlling switch $S\phi_{S1}$ (see FIG. 3). Switch signal $\phi_{S1}$ may also be conveyed to a reset port rst of D-flip-flop 408 via buffer 416. Further, D-flip-flop 408 may generate a signal FF1, which may be conveyed via buffer 418 to D-flip-flop 410, which also receives supply voltage $V_{DD}$. In response to receipt of signal FF1 and supply voltage $V_{DD}$, D-flip-flop 410 may generate switch signal $\phi_{D1}$, which may be used for controlling switch $S\phi_{D1}$ (see FIG. 3). Switch signal $\phi_{D1}$ may also be conveyed to a reset port rst of D-flip-flop 410 via buffer 420. Further, D-flip-flop 410 may generate a signal FF2, which may be conveyed to an input terminal of NAND gate 428.

Signal div2b, which is output from D-flip-flop 402, may be conveyed via buffer 414 to D-flip-flop 404, which also receives supply voltage $V_{DD}$. In response to receipt of signal div2b and supply voltage $V_{DD}$, D-flip-flop 404 may generate switch signal $\phi_{S2}$, which may be used for controlling switch $S\phi_{S2}$ (see FIG. 3). Switch signal $\phi_{S2}$ may also be conveyed to a reset port rst of D-flip-flop 404 via buffer 422. Further, D-flip-flop 404 may generate a signal FF3, which may be conveyed via buffer 424 to D-flip-flop 406, which also receives supply voltage $V_{DD}$. In response to receipt of signal FF3 and supply voltage $V_{DD}$, D-flip-flop 406 may generate switch signal $\phi_{D2}$, which may be used for controlling switch $S\phi_{D2}$ (see FIG. 3). Signal $\phi_{D2}$ may also be conveyed to a reset port rst of D-flip-flop 406 via buffer 423. Further, D-flip-flop 406 may generate a signal FF4, which may be conveyed to another input terminal of NAND gate 428. Upon receipt of signal FF2 from D-flip-flop 410 and signal FF4 from D-flip-flop 406, NAND gate 428 may output a signal $\phi_C$, which may be used for controlling switch $S\phi_C$ (see FIG. 3).

Figure 6:
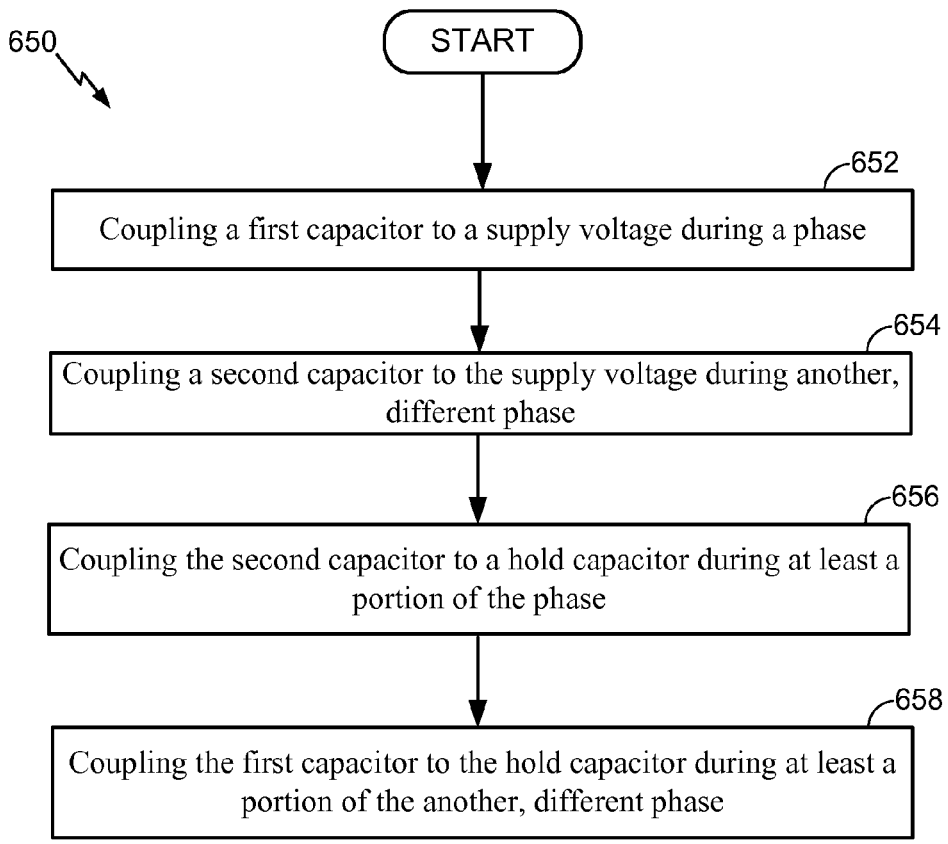
FIG. 6 is a flowchart depicting a method, in accordance with an exemplary embodiment of the present invention.

FIG. 6 is a flowchart illustrating a method 650, in accordance with one or more exemplary embodiments. Method 650 may include coupling a first capacitor to a supply voltage during a phase (depicted by numeral 652). Method 650 may also include coupling a second capacitor to the supply voltage during another, different phase (depicted by numeral 654). In addition, method 650 may include coupling the second capacitor to a hold capacitor during at least a portion of the phase (depicted by numeral 656). Moreover, method 650 may include coupling the first capacitor to the hold capacitor during at least a portion of the another, different phase (depicted by numeral 658).

Figure 7:
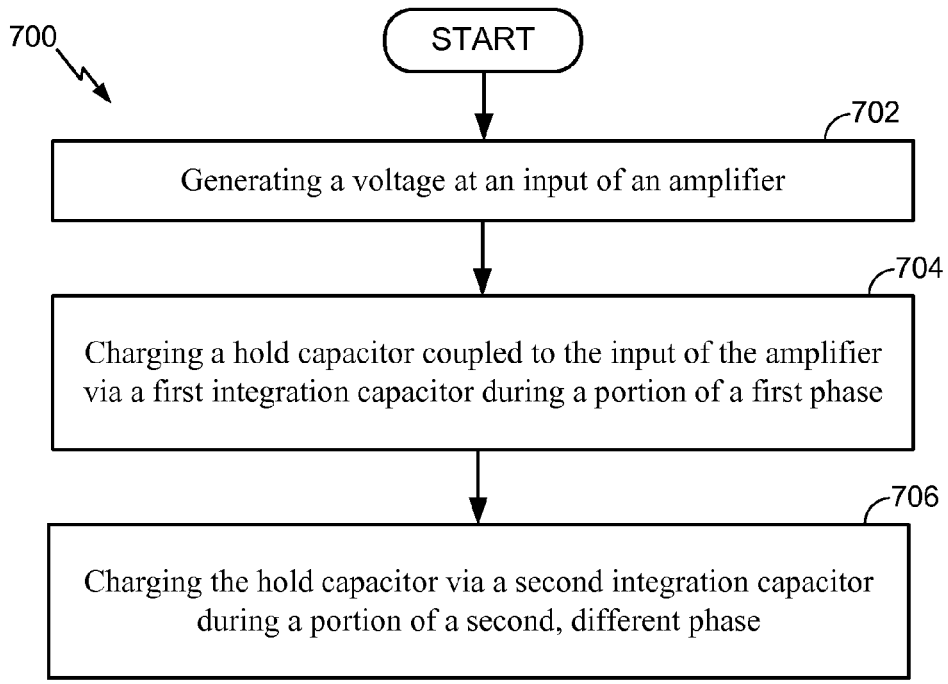
FIG. 7 is a flowchart depicting another method, in accordance with an exemplary embodiment of the present invention.

FIG. 7 is a flowchart illustrating another method 700, in accordance with one or more exemplary embodiments. Method 700 may include generating a voltage at an input of an amplifier (depicted by numeral 702). In addition, method 700 may also include charging a hold capacitor coupled to the input of the amplifier via a first integration capacitor during a portion of a first phase (depicted by numeral 704). Method 700 may also include charging the hold capacitor via a second integration capacitor during a portion of a second, different phase (depicted by numeral 706).

Figure 8:
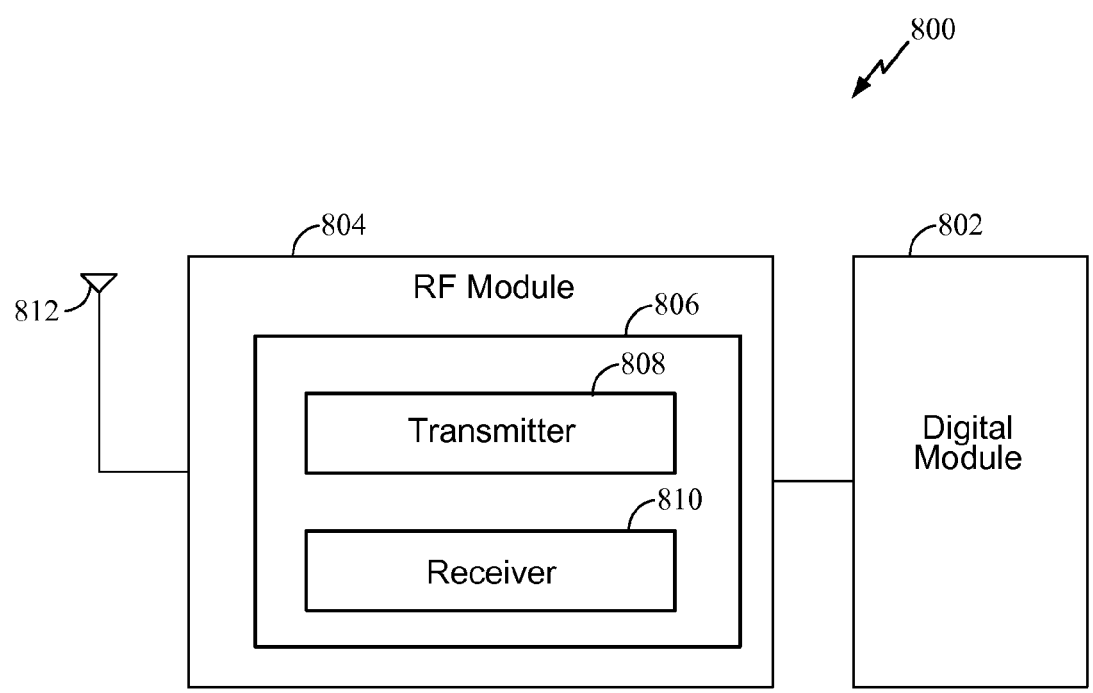
FIG. 8 illustrates a device including a reference current generator, in accordance with an exemplary embodiment of the present invention.

FIG. 8 is a block diagram of an electronic device 800, according to an exemplary embodiment of the present invention. According to one example, device 800 may comprise a portable electronic device, such as a mobile telephone. By way of example, device 800 may comprise at least one current generator 300 described above with respect to FIGS. 3-7. In this example, device 800 includes one or more modules, such as a digital module 802 and an RF module 804. Digital module 802 may comprise memory and one or more processors. RF module 804, which may comprise a radio-frequency integrated circuit (RFIC), may include a transceiver 806 including a transmitter 808 and a receiver 810 and may be configured for bi-directional wireless communication via an antenna 812.

In general, device 800 may include any number of transmitters and any number of receivers for any number of communication systems, any number of frequency bands, and any number of antennas. Further, RF module 804 may include one or more current generators, such as current generator 300 illustrated in FIG. 3. As a more specific, non-limiting example, RF module 804 may include one or more frequency to digital converters (FDC) and/or charge pump based clock multipliers including at least one current generator 300, as illustrated in FIG. 3.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device, comprising:
   a first integration path for charging a first integration capacitor during a first phase, the first integration capacitor being configured to charge a hold capacitor coupled to an amplifier during a second phase;
   a second integration path for charging a second integration capacitor during the second phase, the second integration capacitor being configured to charge the hold capacitor during the first phase;
   a switchable element for enabling the first integration capacitor to discharge during the second phase and another switchable element for enabling the second integration capacitor to discharge during the first phase; and
   a compensation capacitor having a first element coupled to a supply voltage and a second element coupled to each of an output of the amplifier, a gate of a first transistor of the first integration path, and a gate of a second transistor of the second integration path.

2. The device of claim 1, the first integration path including a switchable element for coupling the first integration capacitor to a supply voltage during the first phase and the second integration path including another switchable element for coupling the second integration capacitor to the supply voltage during the second phase.

3. The device of claim 1, each of the first integration path and the second integration path including a transistor for coupling a supply voltage to the respective first and second integration capacitors.

4. The device of claim 1, further comprising a current mirror including at least one of the first integration path and the second integration path and an output path for generating a reference current.

5. The device of claim 1, further comprising a tail current source coupled to the amplifier.

6. A device, comprising:
   a hold capacitor coupled to an input of an amplifier;
   a first integration capacitor configured for selectively charging the hold capacitor;
   a second integration capacitor configured for selectively charging the hold capacitor,
   wherein the first integration capacitor is selectively configured to receive a charge during a first time period and the second integration capacitor is selectively configured to receive a charge during a second, different time period,
   the first integration capacitor is configured for selectively charging the hold capacitor during at least a portion of the second, different time and the second integration capacitor is configured for selectively charging the hold capacitor during at least a portion of the first time period, and
   the first integration capacitor is selectively configured to discharge during at least a portion of the second, different time period, and the second integration capacitor is selectively configured to discharge during at least a portion of the first time period;
   further comprising:
   a first transistor having a gate coupled to an output of the amplifier, a source switchably coupled to a supply voltage, and a drain coupled to the first integration capacitor;
   a second transistor having a gate coupled to the output of the amplifier, a source switchably coupled to the supply voltage, and a drain coupled to the second integration capacitor;

a third transistor having a gate coupled to the output of the amplifier, a source switchably coupled to the supply voltage, and a drain configured to convey a reference current; and a compensation capacitor coupled between the supply voltage and the output of the amplifier.

7. The device of claim 6, the hold capacitor having one side coupled to a ground voltage and another side coupled to a node, the node further coupled to the input of the amplifier.

8. The device of claim 7, each of the first integration capacitor and the second integration capacitor configured for selectively coupling to the node.

9. The device of claim 6, further comprising a tail current source coupled to the amplifier and configured to selectively couple to a ground voltage to generate a tail current during at least a portion of each of the first time period and the second, different time period.

10. A method, comprising:
coupling a first capacitor to a supply voltage during a phase via a first transistor, wherein the supply voltage is coupled to a first element of a compensation capacitor;
coupling a second capacitor to the supply voltage during another, different phase via a second transistor;
coupling the second capacitor to a hold capacitor during at least a portion of the phase, the hold capacitor being coupled to an amplifier;
coupling the first capacitor to the hold capacitor during at least a portion of the another, different phase;
discharging the first capacitor during at least a portion of the another, different phase; and
discharging the second capacitor during at least a portion of the phase,
wherein a second element of the compensation capacitor is coupled to each of an output of the amplifier, a gate of the first transistor, and a gate of the second transistor.

11. The method of claim 10, further comprising conveying a voltage from the hold capacitor to an input of an amplifier during each of the phase and the another, different phase.

12. The method of claim 11, further comprising generating a tail current between the amplifier and a ground voltage during at least a portion of the phase and at least a portion of the another, different phase.

13. The method of claim 10, further comprising:
charging the first capacitor during a complete clock cycle in the phase; and
charging the second capacitor during another complete clock cycle in the another, different phase.

14. A method, comprising:
generating a voltage at an input of an amplifier;
charging a hold capacitor coupled to the input of the amplifier via a first integration capacitor during a portion of a first phase; and
charging the hold capacitor via a second integration capacitor during a portion of a second, different phase;
discharging the first integration capacitor during a portion of the first phase after charging the hold capacitor;
discharging the second integration capacitor during a portion of the second, different phase after charging the hold capacitor;
selectively coupling a supply voltage to the first integration capacitor via a first transistor having a gate coupled to an output of the amplifier, a source switchably coupled to the supply voltage, and a drain coupled to the first integration capacitor, wherein a compensation capacitor is coupled between the supply voltage and the output of the amplifier;

selectively coupling the supply voltage to the second integration capacitor via a second transistor having a gate coupled to the output of the amplifier, a source switchably coupled to the supply voltage, and a drain coupled to the second integration capacitor; and
conveying a reference current via a third transistor having a gate coupled to the output of the amplifier, a source switchably coupled to the supply voltage, and a drain configured to convey the reference current.

15. The method of claim 14, further comprising:
charging the first integration capacitor during the second, different phase; and
charging the second integration capacitor during the first phase.

16. A device, comprising:
means for generating a voltage at an input of an amplifier;
means for charging a hold capacitor coupled to the input of the amplifier via a first integration capacitor during a portion of a first phase;
means for charging the hold capacitor via a second integration capacitor during a portion of a second, different phase;
means for discharging the first integration capacitor during a portion of the first phase after charging the hold capacitor;
means for discharging the second integration capacitor during a portion of the second, different phase after charging the hold capacitor;
means for coupling a supply voltage to the first integration capacitor comprising a first transistor having a gate coupled to an output of the amplifier, a source switchably coupled to the supply voltage, and a drain coupled to the first integration capacitor;
means for coupling the supply voltage to the second integration capacitor comprising a second transistor having a gate coupled to the output of the amplifier, a source switchably coupled to the supply voltage, and a drain coupled to the second integration capacitor;
means for conveying a reference current comprising a third transistor having a gate coupled to the output of the amplifier, a source switchably coupled to the supply voltage, and a drain configured to convey the reference current; and
a compensation capacitor coupled between the supply voltage and the output of the amplifier.

17. A device, comprising:
means for coupling a first capacitor to a supply voltage during a phase comprising a first transistor;
means for coupling a second capacitor to the supply voltage during another, different phase comprising a second transistor;
means for coupling the second capacitor to a hold capacitor during at least a portion of the phase, the hold capacitor being coupled to an amplifier;
means for coupling the first capacitor to the hold capacitor during at least a portion of the another, different phase;
means for discharging the first capacitor during at least a portion of the another, different phase;
means for discharging the second capacitor during at least a portion of the phase; and
a compensation capacitor having a first element coupled to the supply voltage and another element coupled to each of an output of the amplifier, a gate of the first transistor, and a gate of the second transistor.

* * * * *